Feb. 22, 1949.
J. H. DEBS
2,462,728
TIN COATED BAKING PAN WITH
PAINTED EXTERIOR SURFACES
Filed June 20, 1947
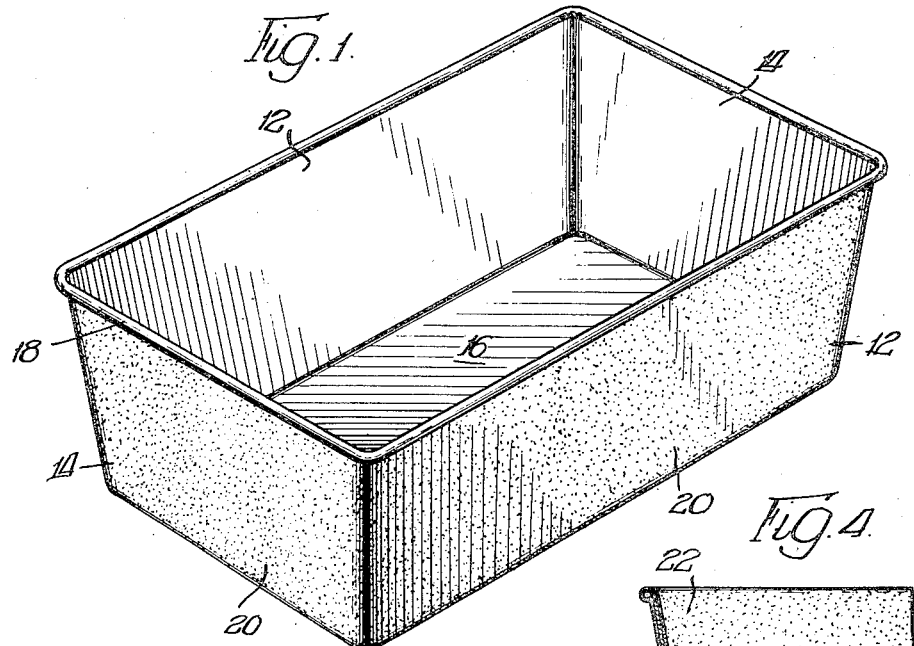
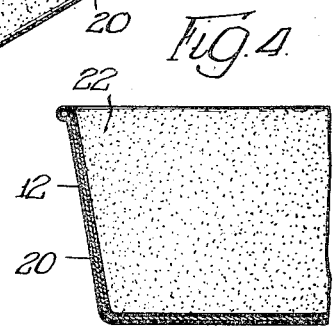
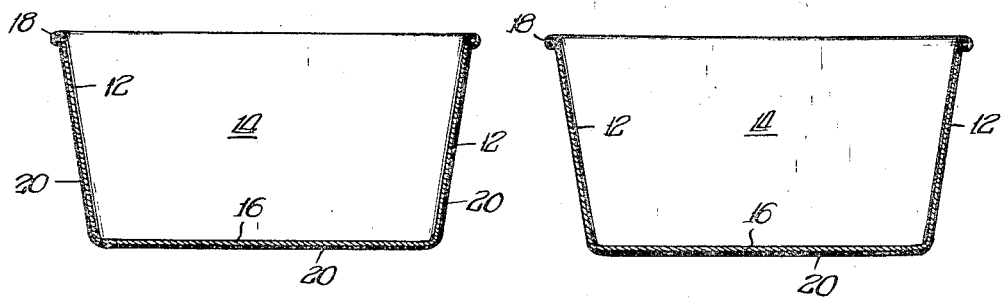
INVENTOR.
Jerome H Debs,
BY
Wilkinson, Huxley, Byron + Hume
Attys Patented Feb. 22, 1949

2,462,728

UNITED STATES PATENT OFFICE 2,462,728

TIN COATED BAKING PAN WITH PAINTED EXTERIOR SURFACES

Jerome H. Debs, Chicago, Ill., assignor to Chicago Metallic Manufacturing Company, Chicago, Ill., a corporation of Illinois Application June 20, 1947, Serial No. 756,016

2 Claims. (Cl. 126—390)

The present invention relates to a new and improved baking pan and more particularly to pans requiring uniform heat absorbing qualities.

Baking pans are ordinarily tin coated, and the brightness of this plating tends to reflect the heat from the surfaces of the pan with the result that the content is not uniformly baked. In order to overcome this objection, it has heretofore been the practice for the baker to burn out a new pan before using it. This process of burning out a baking pan is for the purpose of darkening the surfaces by forming a tin oxide on them. While this undoubtedly improves the heat absorbing qualities of the pan, it requires an extra undesirable operation and causes an unwanted delay in using a new pan. This adds to the expense, and the oxide coating resulting from such a burning may not be uniform.

It is, therefore, an object of the present invention to provide a baking pan which may be used immediately without first burning it out.

Another object is to provide a baking pan which has superior heat absorbing qualities.

A further object is to provide a baking pan which has uniformly dark coloration on the exterior surfaces.

It is an additional object to provide a pan with a dark surface coloration not permanent in nature which may wear off as the pan is gradually burned in.

With these and various other objects in view, the invention may consist of certain novel features, as will be more fully described and particularly pointed out in the specification, drawings and claims appended hereto.

In the drawings which illustrate an embodiment of the invention, and wherein like reference characters are used to designate like parts—

Fig. 1 is a perspective view of an embodiment of the invention;

Fig. 2 is a sectional elevation of the device shown in Fig. 1;

Fig. 3 is a sectional elevation showing a modification of the invention; and

Fig. 4 is a fragmentary section showing a further modification.

Referring more in detail to the drawings, a pan embodying the improvements according to the present invention, as shown in Figs. 1 and 2, consists of a pair of oppositely disposed side walls 12, end walls 14 and a bottom portion 16. The embodiment shown has a beaded or rolled rim 18 and the walls are tapered outwardly. The exact construction, shape and size of the pan will be determined by the particular use for which it is intended. Baking pans are frequently formed in sets or sheets; that is, a plurality of pans are connected together so that they may be handled as a single unit. The present invention is applicable to sets or sheets of pans, as well as individual pans of various shapes and sizes.

The pan illustrated is of the usual sheet metal construction, and is tin plated. The forms of construction of Figures 1, 2 and 3 have the outer surfaces of the side walls 12, end walls 14 and bottom 16 coated with a dark material 20 of non-permanent character such as black lacquer or enamel. This material may be sprayed on the surfaces or otherwise applied. In this form of construction, the tin plated interior surfaces remain bright and shiny, making the pans easier to clean and presenting a sanitary appearance. The dark coated outer surfaces of the pan absorb heat rather than reflect it and the coating, being uniform, results in more rapid and uniform heat absorption.

In the embodiment shown in Figure 3, only the exterior of the bottom 16 of the pan has been coated with a dark material 20. The outer surfaces of the end and side walls remain in their original tin coated condition, as do the inner walls and the interior of the bottom 16.

The embodiment shown in Figure 3 is particularly suited for such baking operations wherein uniform and greater heat absorption is desired at the bottom rather than the bottom and sides. The tin plated side and end walls tend to reflect heat and, consequently, the heat absorption will be less than at the bottom of the pan.

The construction shown in Figure 4 has a dark interior coating 22, in addition to the dark coating 20 on the outer side and end walls and bottom.

The coating is of a type adapted to gradually burn or wear off in use. As the coating is gradually burned or worn away, the tin coating will be progressively exposed. This exposure will permit a gradual burning in the tinned surface. Thus, a pan is provided which needs no preliminary burning in and which will perform satisfactorily from its first use. During use it gradually assumes the character of a pan of usual type which has been burned in normally. The particular composition of the paint or lacquer forms no part of the present invention, providing that the material is of a character capable of performing the objects of the invention. It will be understood that various standard types of paints which may be more or less permanent for some uses are non-permanent when used under oven heat conditions and under the wear incident to handling pans and moving them on oven floors. A commercial type of paint which is suitable consists of the following ingredients:

| | | |
|---|---|---|
| Aluminum powder | pounds | 50 |
| Titanium dioxide | do | 20 |
| Calcium carbonate | do | 40 |
| 60% coumarone-indene | do | 140 |
| Varnish | do | 930 |
| Toluol | gallons | 78 |
| Cobalt drier | do | 7/8 |
| Calcium octoate | do | 2 |

Another suitable paint comprises the following:

| | | |
|---|---|---|
| Aluminum paste | pounds | 45 |
| Varnish | gallons | 50 |
| Coumarone-indene | do | 25 |
| 33% Chlorinated rubber solution | do | 7½ |
| Fish oil | do | 10 |
| Toluol | do | 3 |
| Xyol | do | 2 |

A further suitable paint comprises:

| | | |
|---|---|---|
| Aluminum powder | pounds | 5 |
| Varnish | gallons | ½ |
| Fish oil | do | 1½ |
| Coumarone-indene | do | 9 |
| Cobalt drier | fluid ounces | 4 |
| Manganese drier | do | 3 |

It will be understood that the lacquer, enamel or other coating used is non-toxic in character and suitable for use in a food container under heat conditions.

The dark coating may be applied to the sheet metal before the pan is formed, or it may be applied after the pan is otherwise completed.

The invention is not to be limited to or by details of construction of the particular embodiment thereof illustrated in the drawings, as various and other forms of the invention will, of course, be apparent to those skilled in the art without departing from the spirit of the invention or the scope of the claims.

I claim:

1. In combination with a sheet metal, tin coated baking pan having side walls and a bottom portion, a coating of heat absorbing paint on the exterior surfaces of said walls and bottom portion, said paint being non-permanent in character under the conditions of heat and wear in the use of the pan in a baking oven and serving to gradually expose the tinned surface for burning out of said surface.

2. In combination with a sheet metal, tin coated baking pan having side walls and a bottom portion, a coating of heat absorbing paint on the exterior surface of said bottom portion, said paint being non-permanent in character under the conditions of heat and wear in the use of the pan in a baking oven and serving to gradually expose the tinned surface for burning out of said surface.

JEROME H. DEBS.

REFERENCES CITED

The following references are of record in the file of this patent:

UNITED STATES PATENTS

| Number | Name | Date |
|---|---|---|
| 1,553,617 | Katzinger | Sept. 15, 1925 |
| 2,315,475 | Cobb et al. | Mar. 30, 1943 |

FOREIGN PATENTS

| Number | Country | Date |
|---|---|---|
| 217,616 | Great Britain | June 26, 1924 |
| 336,029 | Germany | Apr. 21, 1921 |